Aug. 4, 1936.    S. SMITH    2,050,071
HINGE
Original Filed Oct. 12, 1933

INVENTOR
SYDNEY SMITH
BY *Francis E. Boyce*
ATTORNEY

Patented Aug. 4, 1936

2,050,071

UNITED STATES PATENT OFFICE 2,050,071

HINGE

Sydney Smith, Chobham, England

Original application October 12, 1933, Serial No. 693,290. Divided and this application December 4, 1934, Serial No. 755,898. In Great Britain October 14, 1932

7 Claims. (Cl. 16—128)

This invention relates to hinges and particularly concerns hinges for attaching the doors to bodies of automobile vehicles of the saloon type, being a division of application Serial No. 693,290 filed October 12, 1933.

The invention relates to resilient hinges including a resilient member disposed between a pair of attachment plates, the arrangement being that by virtue of the resilient member the attachment plates can move relative to one another to a certain limited extent, and the position of the member carried by the hinges can be varied or adjusted to accommodate slight variations or lack of uniformity in the parts of the structure.

It is known to provide a pin or cylindrical rod of rubber or other resilient material between a pair of attachment plates, but such constructions have only been resilient to a limited degree, and the object of this invention is to provide a hinge of improved construction which will provide increased resilience, or resilience in a number of directions.

For example, in the application to the door of a motor vehicle of the saloon type, it is desirable that the door should engage at all four of its edges with the edges or flanges of the door opening in order to avoid noise or rattling due to the vibration or motion of the vehicle, and to enable this preferred seating of the door it is necessary that the door shall be capable of adjusting itself in a vertical direction parallel to the height of the door in addition to the adjustment in a horizontal direction parallel to the length of the vehicle.

The combination of the hinge with a vehicle door forms no part of the present invention however, and in my co-pending application No. 715,858 I have covered combinations of resilient hinges with particular vehicle door constructions.

Accordingly the present invention provides broadly a hinge including a ball of rubber or other resilient material located between opposed cup-like portions upon a pair of attachment plates, and means for connecting these attachment plates together with the ball engaged therebetween.

The resilient member is thus disposed to the maximum advantage, since stresses are taken across the plane of maximum area, and the attachment plates can be moved to a limited degree around the ball which in addition permits movement in any of the desired directions.

Referring to the drawing:—

In the construction illustrated, the hinge comprises two attachment plates each having a cup-like portion and disposed with these cup-like portions opposed or directed towards one another to engage around a ball 5 of rubber or other resilient material.

Each attachment bracket comprises two sheet metal pressings 6 and 7 each formed at one end with a part spherical cup 8, and at the other end with an attachment flange 9.

Figure 3:
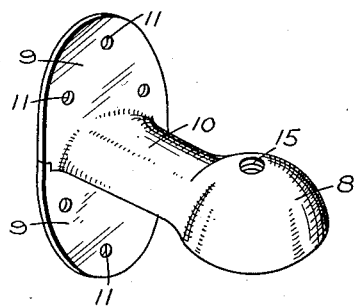
Figure 3 is a perspective view of one of the attachment plates.

The two pressings are welded together so that the cups 8 nest one within the other and the flanges 9 extend in opposite directions in a common plane as shown in Figure 3, whilst the portions of the pressings connecting the cups to the attachment flanges combine to form an arm 10 of hollow or girder-like form.

This arm is of substantial strength and provides a strong and rigid connection between the attachment flanges 9 and the cups 8.

Each attachment bracket is secured in position by means of bolts or rivets inserted through holes 11 in the flanges 9, and when the hinge is mounted in position one attachment bracket is secured to the door 12 or other member to be hinged, whilst the other bracket is secured to the supporting structure 13 adjacent the edge of the opening for the hinged member.

Figure 1:
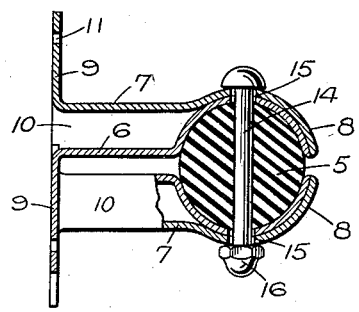
Figure 1 is a vertical section through one form of hinge constructed in accordance with this invention.
Figure 2:
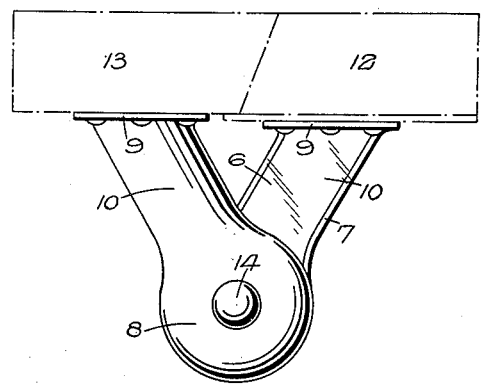
Figure 2 is a plan view of same.

When in position the ball 5 is disposed between the opposed cups as is shown in Figure 1, and these cups are connected by a bolt 14.

Each attachment bracket is formed with a hole 15 at the centre of the cup-like portion, and this hole 15 is of diameter greater than that of the bolt 14 to provide clearance between the bolt and the edges of the opening when the hinge is assembled.

The bolt is threaded through the openings 15 and through a hole formed diametrically through the ball 5, and an adjustable clamping nut 16 is provided on the lower end of the bolt so that the brackets can be clamped together and the ball clamped firmly between the two cup-like portions.

The hinge will allow any necessary movement of the hinge member relative to the supporting structure, and the hinge is resilient in an axial direction, i. e. parallel to the hinging axis or the axis of the bolt 14, and in addition is capable of limited movement in a direction transverse to this axis so that the hinged member can adjust itself in any direction.

The operation of the hinge can be controlled by adjusting the nut 16 which controls the pressure upon the ball and consequently the resilience of the hinge, and by tightening the nut from the position shown in Figure 1 the ball can be compressed between the cups. This compression decreases the resilience of the ball itself which tends to become more compact and consequently less resilient, and in addition the material of the ball is bulged out into the space between the two cups so that the effective area or section of the ball is increased with consequent reduction in the resilience.

What I claim is:—

1. A hinge including a pair of attachment brackets, a cup-like portion on each of said brackets a ball of rubber located between said cup-like portions, a connecting pin extending through said ball and connecting said cup-like portions and projecting shoulders at each end of said pin engaging with the cup-like portions on outer surfaces thereof which are of curvature concentric with that of said ball and said pin passing through clearance holes in said cups to enable limited movements of the cups around said ball and relative to said pin.

2. A hinge including a pair of attachment brackets, a cup-like portion on each of said brackets, each of said portions having an inner and an outer surface of part spherical form, a ball of rubber located between the inner part spherical surfaces of said cup-like portions, a clamping bolt extending through said ball and connecting said cup-like portions, enlargements on each end of said bolt, means associated with said bolt for varying the degree of compression of said ball so as to adjust the resilience of the hinge, said means being adapted to press said ball tightly on to the surface of said connecting bolt to locate the latter firmly in the ball, said enlargements engaging the part spherical external surfaces of said cup-like portions and said pin passing through clearance holes in said portions to enable limited movement of the latter around said ball and relative to said pin.

3. A hinge including a pair of attachment brackets, a cup-like portion on each of said brackets, each of said brackets being formed from two sheet metal pressings, a cup-like portion on each of said pressings, an attachment flange on each pressing, and an arm connecting said flange and said cup-like portion on each pressing, said pressings being secured together with said cup-like portions nested one within the other, a ball of rubber located between the cup-like portions on said two brackets, and a connecting pin extending through said ball and connecting said cup-like portions.

4. A hinge including a pair of attachment brackets, a cup-like portion on each of said brackets, each of said brackets being formed from two sheet metal pressings, a cup-like portion on each of said pressings, an attachment flange on each pressing, and an arm connecting said flange and said cup-like portion on each pressing, said pressings being secured together with said cup-like portions nested one within the other, a ball of rubber located between the cup-like portions on said two brackets, a clamping bolt extending through said ball and connecting said cup-like portions, and means associated with said bolt for varying the degree of compression of said ball so as to adjust the resilience of the hinge.

5. A hinge including a pair of attachment brackets, a cup-like portion on each of said brackets, each of said portions having an inner and an outer surface of part spherical form, each bracket having a hole in the centre of said cup-like portion, a ball of rubber located between the inner part spherical surfaces of said cup-like portions, said ball having a hole diametrically therethrough, a connecting bolt extending through and gripped tightly in the hole in said ball and passing loosely through the holes in said cup-like portions, a head at one end of said bolt, a clamping nut at the other end of said bolt for varying the degree of compression of said ball, said head and said nut engaging the outer part spherical surfaces of said cup-like portions and the holes in said latter being of greater diameter than that of the connecting bolt to allow movement of the bolt relative to said cup-like portions.

6. A hinge including a pair of attachment brackets, a cup-like portion on each of said brackets, each of said brackets being formed from two sheet metal pressings, a cup-like portion on each of said pressings, an attachment flange on each pressing, and an arm connecting said flange and said cup-like portion on each pressing, said pressings being secured together with said cup-like portions nested one within the other, each bracket having a hole in the centre of said cup-like portion, a ball of rubber located between the cup-like portions on said two brackets, said ball having a hole diametrically therethrough, a connecting bolt extending through the hole in said ball and the holes in said cup-like portions, and said latter holes being of greater diameter than that of the connecting bolt to allow movement of the bolt relative to said cup-like portions.

7. A hinge including a pair of attachment brackets, a cup-like portion on each of said brackets, a ball of rubber located between said cup-like portions, a connecting pin, each of said cup-like portions having a curved outer surface and an opening therethrough of area greater than the cross sectional area of said pin, said pin passing through said ball and through said openings and engaging the curved outer surfaces of said cup-like portions so that the latter can move around the surface of the ball and relative to said pin.

SYDNEY SMITH.